United States Patent Office 3,120,520
Patented Feb. 4, 1964

3,120,520
2-STYRYLBENZOXAZOLE BRIGHTENERS
Bennett G. Buell, Somerville, N.J., assignor to American Cyanamid Company, New York, N.Y., a corporation of Maine
No Drawing. Filed Nov. 17, 1961, Ser. No. 153,197
6 Claims. (Cl. 260—240)

This invention relates to the provision of new and useful organic compounds. More particularly, this invention relates to the provision of a new class of fluorescent substituted 2-styrylbenzoxazole compounds which are useful inter alia, for "invisible" marking and as brightening agents for polymeric organic materials such as natural and synthetic fibers, resin masses and lacquers.

The compounds of the present invention are represented by the following formula:

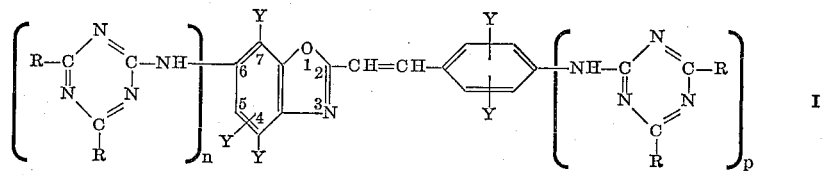

wherein the R radicals are individually halogen, hydroxy, lower alkoxy, amino, mono-lower alkylamino, di-lower alkylamino, mercapto, lower alkylthio, arylthio, hydroxyalkylamino, bis-hydroxyalkylamino or arylamino, including halo- and sulfo-substituted derivatives thereof; each Y radical is either hydrogen, lower alkoxy, halogen or lower alkyl; and $n$ and $p$ are integers each less than two such that their sum is a positive integer less than three. The terms "lower alkyl" and "lower alkoxy" and the like are used in their conventional sense to designate cyclic, straight or branched chain moieties having from one to seven carbon atoms.

Fluorescent compounds which are essentially colorless have been used for many purposes. Thus they have been employed for "invisibly" marking a variety of materials. Marked materials are not visibly altered, however they can be readily identified by irradiation with ultraviolet light. Examples of such uses are marking inks for laundry, incorporation in plastics, oil, waxes, etc. By far the major use of fluorescent compounds has been for imparting a bleached, i.e., a whiter or brighter, appearance to materials which normally have a dull, yellowish tinge in the untreated state. Undoubtedly, this "optical bleaching" action is the result of an ability to convert certain ultraviolet components of incident daylight to visible blue components which complement and cancel the undesired tinge in the untreated material.

The compounds of this invention represented by Formula I, are fluorescent, and have affinity for, and solubility in, a variety of materials. They can thus be used for invisible marking or optical brightening purposes as above described.

The compounds of this invention may be prepared by a process which is represented in the following flow sheet wherein $n$, $p$, R and Y are as hereinbefore defined, X is either hydrogen or nitro, at least one being nitro, and X′ is either amino or hydrogen, depending on the value of X in the unreduced precursor.

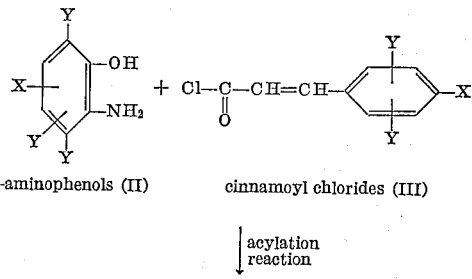

2-aminophenols (II)     cinnamoyl chlorides (III)

↓ acylation reaction

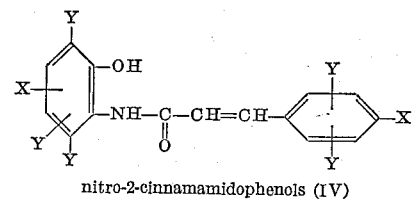

nitro-2-cinnamamidophenols (IV)

↓ ring closing-dehydration

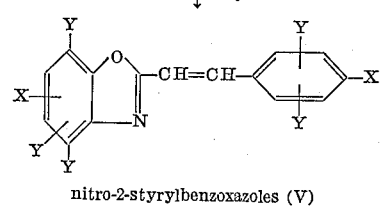

nitro-2-styrylbenzoxazoles (V)

↓ reduction

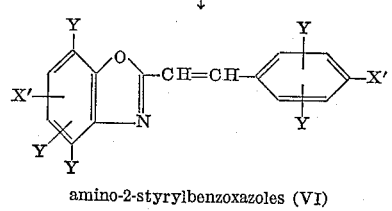

amino-2-styrylbenzoxazoles (VI)

↓ mono- or di-triazinylation

COMPOUNDS OF FORMULA I

The reaction of the aminophenol and the cinnamoyl halide to give the nitro cinnamamidophenols of Formula IV is preferably conducted in the presence of an organic base as solvent and acid acceptor (e.g., pyridine, triethylamine and dimethylaniline) at elevated temperature. While the above reaction has been illustrated with an acyl chloride, the acyl bromide can be used, although the former is preferred for its convenience and availability. Since the ultimate compounds of this invention may have a triazinylamino group on the benzo moiety of the benzoxazole and/or the phenyl radical of the styryl moiety, the foregoing reaction may employ aminophenols and cinnamoyl chlorides with or without nitro radicals, provided that at least one reactant has a nitro group.

The list of suitable phenols includes inter alia:

2-aminophenol
3-chloro-2-aminophenol
4-chloro-2-aminophenol
5-chloro-2-aminophenol
6-chloro-2-aminophenol
3-bromo-2-aminophenol
3-fluoro-2-aminophenol
3,6-dichloro-2-aminophenol
4,6-dichloro-2-aminophenol
3-bromo-6-chloro-2-aminophenol
3-methyl-2-aminophenol
4-methyl-2-aminophenol
4-ethyl-2-aminophenol
4,6-dimethyl-2-aminophenol
6-chloro-3-methyl-2-aminophenol
6-chloro-4-methyl-2-aminophenol
3-chloro-6-methyl-2-aminophenol
3-bromo-6-methyl-2-aminophenol
4-methoxy-2-aminophenol
5-ethoxy-2-aminophenol
4-methoxy-6-chloro-2-aminophenol
6-methoxy-4-methyl-2-aminophenol
4-nitro-2-aminophenol
5-nitro-2-aminophenol
5-nitro-4-methyl-2-aminophenol
4-nitro-6-methyl-2-aminophenol
5-nitro-3-methyl-2-aminophenol
5-nitro-3-ethyl-2-aminophenol
5-nitro-4-ethyl-2-aminophenol
4-nitro-6-chloro-2-aminophenol
5-nitro-3-chloro-2-aminophenol
5-nitro-4-chloro-2-aminophenol
5-nitro-4,6-dichloro-2-aminophenol
4-nitro-3-chloro-6-methyl-2-aminophenol
5-nitro-4-methoxy-2-aminophenol
4-nitro-6-methoxy-2-aminophenol The list of suitable cinnamoyl halides includes inter alia:

Cinnamoyl chloride
Cinnamoyl bromide
2,3 or 4-methylcinnamoyl chloride
3-ethylcinnamoyl chloride
4-isopropylcinnamoyl chloride
2-n-butylcinnamoyl chloride
2-hexylcinnamoyl chloride
2,4-dimethylcinnamoyl chloride
2,3 or 4-chlorocinnamoyl chloride
2,3 or 4-bromocinnamoyl chloride
3,5-dichlorocinnamoyl chloride
2-methyl-4-chlorocinnamoyl chloride
2,3 or 4-methoxycinnamoyl chloride
3-methoxy-4-chlorocinnamoyl chloride
6-methoxy-4-methylcinnamoyl chloride
4-nitrocinnamoyl chloride
4-nitrocinnamoyl bromide
2-methyl-4-nitrocinnamoyl chloride
3-methyl-4-nitrocinnamoyl chloride
3-chloro-4-nitrocinnamoyl chloride
3,5-dichloro-4-nitrocinnamoyl chloride
2-methyl-5-chloro-4-nitrocinnamoyl chloride
2-methoxy-4-nitrocinnamoyl chloride
3-methoxy-6-chloro-4-nitrocinnamoyl chloride The nitro-2-cinnamamidophenols of Formula IV prepared by the foregoing reaction are ring-closed by a conventional dehydration reaction to yield the corresponding nitro-2-styrylbenzoxazoles of Formula V. Such dehydration may be effected by fusion in a non-aqueous medium such as boric acid at a temperature above 170° C., but below decomposition, i.e., 275° C.

The resulting nitro-2-styrylbenzoxazoles of Formula V are reduced to their amino analogs of Formula VI by treatment with conventional reducing agents such as inorganic sulfides, e.g., hydrogen sulfide, sodium sulfide and sodium hydrosulfide, in an organic solvent such as a lower alkanol.

The compounds of Formula I are obtained by reacting the free amino groups of the compounds of Formula VI with a chlorotriazine derivative along conventional lines. Thus, the amino-2-styrylbenzoxazole may be reacted with 2-chlorotriazinyl compounds to give the product. Or alternatively, the amino-2-styrylbenzoxazole is reacted with one mole of cyanuric chloride, and the remaining chlorines replaced if desired by further reaction with water, alcohols, phenols, ammonia, primary and secondary amines, bisulfide salts, mercaptans or thiophenols.

Suitable triazines for this reaction are inter alia:

Cyanuric chloride
Cyanuric bromide
2,6-dichloro-4-methoxy-s-triazine
4,6-dimethoxy-2-chloro-s-triazine
4,6-diethoxy-2-chloro-s-triazine
4,6-bis-(β-ethoxyethoxy)-2-chloro-s-triazine
2,6-dichloro-4-hydroxy-s-triazine
2-chloro-4,6-dihydroxy-s-triazine
2-chloro-4,6-diamino-s-triazine
4-amino-2,6-dichloro-s-triazine
2-chloro-4,6-bis(dimethylamino)-s-triazine
2,6-dichloro-4-methylamino-s-triazine
2-chloro-4,6-bis(hydroxyethyl)amino-s-triazine
2,6-dichloro-4-hydroxyethylamino-s-triazine
2,6-dichloro-4-anilino-s-triazine
2,6-dichloro-4-(p-sulfoanilino)-s-triazine When halogen atoms still remain on the triazine ring of the triazinylamino-2-styrylbenzoxazole thus formed, these may be further replaced by reaction with nucleophilic agents, such as water, a lower alkanol (e.g., methyl alcohol and ethyl alcohol), alkyl glycol ethers (e.g., methoxyethanol), phenol, ammonia, lower alkylamines (e.g., ethylamine and dimethylamine), lower alkanol amines (e.g., monoethanolamine, diethanolamine and isopropanolamine), aniline, sulfanilic acid, metanilic acid, sodium bisulfide, lower alkyl mercaptans (e.g., methyl mercaptan) or thiophenol.

The following examples in which parts are by weight, are presented to further illustrate this invention.

*Example 1*

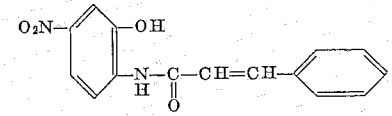

To a solution of 15.4 grams of 2-amino-5-nitrophenol in 30 ml. of pyridine is added 16.7 grams of cinnamoyl chloride. The mixture is heated on a steam bath until the reaction is complete (½ hour), cooled and poured into an ice-water mixture. The product is isolated by filtration and dried at 55° C.

*Example 2*

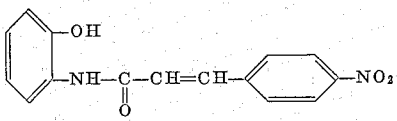

To a solution of 21 grams of 4-nitrocinnamoyl chloride in 50 ml. of pyridine is added 10.9 grams of o-aminophenol in 100 ml. of pyridine. The solution is heated at reflux for two hours, drowned in water, filtered and dried at 55° C.

*Example 3*

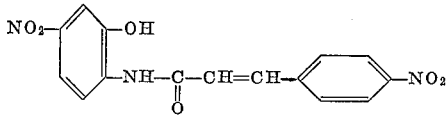

A mixture of 9.65 grams of 4-nitrocinnamic acid and 100 ml. of thionyl chloride is heated at reflux until the formation of the acid chloride is complete (2 hrs.). A clear solution results. The excess thionyl chloride is removed by vacuum distillation, benzene added and the distillation continued to remove traces of thionyl chloride and the benzene. The residue is dissolved in 50 ml. of pyridine and 7.2 grams of 5-nitro-2-aminophenol added. The mixture is heated at reflux until the reaction is complete (2 hrs.), and is drowned in an ice-water mixture. The amide is isolated by filtration and dried.

*Example 4*

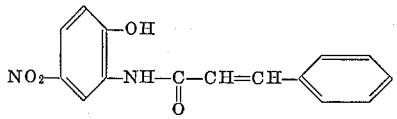

Heated on a steam bath are 22.5 grams of 2-amino-4-nitrophenol, 150 ml. of pyridine and 24.3 grams of cinnamoyl chloride. When the reaction is complete, the mixture is poured into ice water. The resultant product, 2-cinnamamido-4-nitrophenol is isolated by filtration, washed with water and dried at 55° C.

*Example 5*

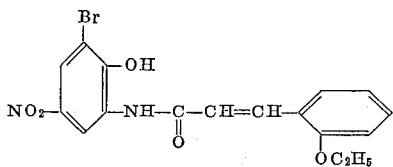

The above product is obtained by following the procedure of Example 3, with the substitution of equivalent amounts of 6-bromo-4-nitro-2-aminophenol for the 5-nitro-2-aminophenol, and of 2-ethoxycinnamic acid for the 4-nitrocinnamic acid of that example.

*Example 6*

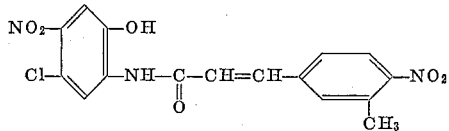

The above product is obtained by following the procedure of Example 3, with the substitution of equivalent amounts of 4-chloro-5-nitro-2-aminophenol for the 5-nitro-2-aminophenol, and of 3-methyl-4-nitrocinnamic acid for the 4-nitrocinnamic acid of that example.

*Example 7*

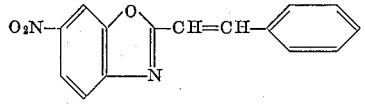

A mixture of 27.1 grams of 2-cinnamamido-5-nitrophenol and 6.2 grams of boric acid is fused at 240° C. until the reaction is complete. The fusion product is ground, taken up to hot methoxyethanol, treated with activated charcoal and filtered. The filtrate is cooled and the product precipitated by the addition of water. The product, 2-styryl-6-nitrobenzoxazole, is isolated by filtration, washed with water and dried at 55° C.

*Example 8*

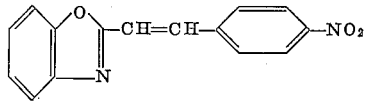

The amide of Example 2 is fused with 6 grams of boric acid at 235–240° C. for 15 minutes. The fusion mixture is dissolved in methoxyethanol, clarified with activated charcoal, filtered and reprecipitated by the addition of water to yield the product.

*Example 9*

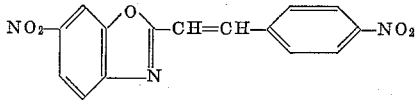

The above product is obtained by fusion of the compound of Example 3 in accordance with the procedure of Example 8.

*Example 10*

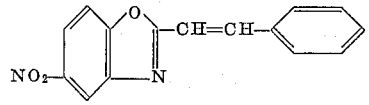

The above product is obtained by fusion of the amide of Example 4 in accordance with the procedure of Example 8.

*Example 11*

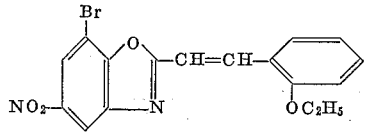

The above product is obtained by fusion of the amide of Example 5 in accordance with the procedure of Example 8.

*Example 12*

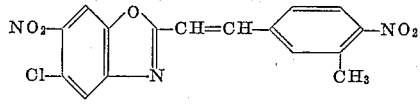

The above product is obtained by fusion of the product of Example 6 in accordance with the procedure of Example 8.

*Example 13*

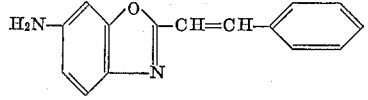

A slurry of 15.8 grams of the product of Example 7, 2-styryl-6-nitrobenzoxazole, in 125 ml. of ethanol is heated to the boil. A solution of 10 grams of sodium sulfhydrate in 40 ml. of water is added gradually (in 10 min.). The temperature is maintained until the reaction is complete (another 10 min.). The product is precipitated by the addition of water. It is then isolated by filtration, washed with water and dried at 55° C.

*Example 14*

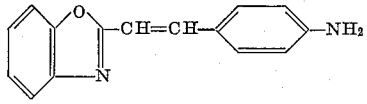

The nitrobenzoxazole of Example 8 is reduced in 500 ml. of alcohol at 80° C. by addition of 32 grams of sodium hydrosulfide in 200 ml. of water. When the reaction is complete, activated charcoal is added and the mixture filtered and then drowned. Filtration, washing and drying yields the product.

Example 15

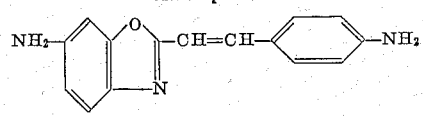

The nitrobenzoxazole of Example 9 is reduced by slurrying in 200 ml. of alcohol, adding 16 grams of NaSH in 50 ml. of water and heating at reflux until the reaction is complete (1 hr.). The product is obtained by drowning on ice, filtration and drying.

Example 16

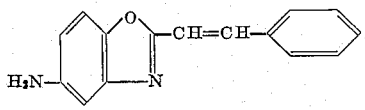

The product of Example 10 is slurried in 200 ml. of ethyl alcohol and heated to reflux. A solution of 17 grams of sodium hdyrogen sulfide in 80 ml. of water is added and the reaction heated at reflux until reduction is complete. The solution is then treated with water to precipitate the product. The 2-styryl-5-aminobenzoxazole product is filtered, washed with water and dried at 55° C.

Example 17

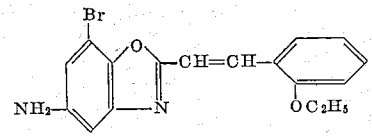

Following the reduction procedure of Example 13 the product of Example 11 is converted to the compound of the above formula.

Example 18

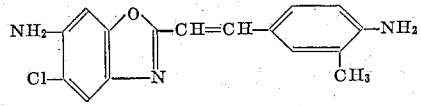

Following the reduction procedure of Example 13 the benzoxazole of Example 12 is converted to the compound of the above formula.

The following examples show the preparation of the final compounds of this invention from the intermediates obtained in the foregoing examples. The evaluation of the compounds as brighteners is based in part on results of the following test procedures.

A. METHOD OF APPLYING BRIGHTNESS TO COTTON, NYLON AND ACETATE IN THE PRESENCE OF DETERGENT

To 40 cc. of distilled water in a Launder-Ometer jar is added 10 cc. of a 0.005% concentration of the brightener product in water and 50 cc. of a 1.0% concentration of detergent in water. A wet-out five-gram skein or piece of fabric comprising bleached cotton muslin 80 x 80, or resin treated cotton or scoured nylon tricot, is added. The jar is closed, shaken and run for 25 minutes at 130° F. in a Launder-Ometer. The fabric is then rinsed three times with water at 75° F. and air dried in the dark at 75° F. and 65% relative humidity.

Detergents used may be nonionic or anionic.

B. METHOD FOR APPLYING BRIGHTNESS TO WOOL AND NYLON IN THE PRESENCE OF ACID OF GLAUBER'S SALT.

To a Launder-Ometer jar is added 98.5 cc. or 97.5 cc. of distilled water, depending on the respective choice of the following acids.

1.5 cc. of a 10% solution of 28% acetic acid
2.5 cc. of a 10% solution of Glauber's salt Then 5 cc. of 0.005% solution of brightener is added followed by a 5-gram skein or piece of nylon or wet-out wool flannel. The jar is closed and run for 25 minutes at 130° F. in a Launder-Ometer. The nylon or wool is removed, rinsed with water of 75° F. three times and air-dried in the dark at 75° F. and 65% relative humidity.

Example 19

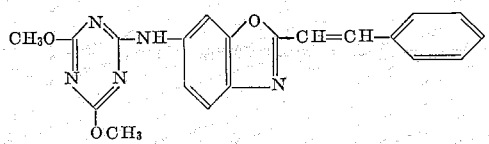

A mixture of 2.36 grams of the compound of Example 13, 150 ml. of methoxyethanol, 1.93 grams of 2-chloro-4,6-dimethoxy-s-triazine and 0.84 gram of sodium bicarbonate is stirred and heated until the temperature reaches 97° C. The reaction mixture is maintained at this temperature until the reaction is complete. It is then cooled and 200 ml. water added. The product is filtered and air dried.

This brightener, when applied to cotton and nylon, significantly whitens the cloth. The strength and intensity of fluorescence in ultraviolet light is 150 to 200% greater than an equivalent amount of a prior art commercial stilbene brightener on cotton. On nylon it is 200% stronger than the equivalent amount of a commercial coumarin brightener. Further, the lightfastness of the treated fabric is likewise greatly superior.

This brightener also whitens acetate and wool, resin-treated cotton, and to some extent terephthalic polyester fiber. It builds up well on cotton in successive detergent washes, can be applied to cotton from a cationic softener bath, and in general is a preferred brightener for cotton.

Example 20

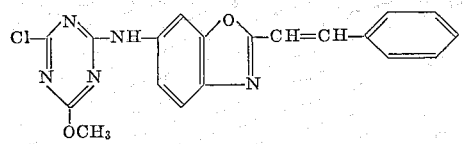

A mixture of 4.72 grams of the product of Example 13, 150 ml. of acetone and 3.96 grams of 2,4-dichloro-6-methoxy-s-triazine is stirred and heated gradually to 44° C. It is then cooled and diluted with water. The product is isolated by filtration, washed with water and dried at 55° C.

This brightener markedly whitens cotton, nylon and acetate. It shows good substantivity for cotton, resin-treated cotton and acetate and especially good substantivity for nylon.

Example 21

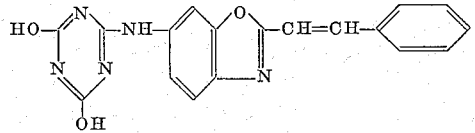

To 120 ml. of acetone is added 2.36 grams of the product of Example 13. After cooling to 0° C., 1.86 grams of cyanuric chloride in 50 ml. acetone is added. To the resultant slurry is added 2 ml. of 5 N sodium hydroxide solution and after stirring a half hour, the reaction is heated to 50° C., 1.64 grams of sodium bicarbonate and 200 ml. water are added. The mixture is then cooled and the product filtered and dried. It is then reprecipitated from glacial acetic acid by the addition of water, filtered and washed with water. The wet product is dissolved in a hot solution of methoxyethanol with the aid of 5 N NaOH solution and water, clarified by filtration through activated charcoal and reprecipitated by the addition of acid. The product is filtered, washed with water and dried.

This brightener shows excellent substantivity for cotton and good fastness to light.

Example 22

Two grams of the product of Example 13 in 125 ml. of acetone is cooled to 0° C. To it is added 1.55 grams of cyanuric chloride in 50 ml. of acetone. Then 1.7 ml. of 5 N sodium hydroxide solution and 25 ml. water are added and the whole stirred one hour. Ethanolamine, 2.05 grams, is added and the reaction mixture heated to 50° C. The acetone is distilled off and replaced with methoxyethanol. The mixture is heated at reflux until the reaction is complete. It is then cooled, water is added and the mixture is allowed to stand. The product is isolated by filtration, washed with water and dried at 55° C.

This brightener shows excellent affinity for, and fluorescence on cotton, nylon, acetate and wool. Also it has good lightfastness.

Example 23

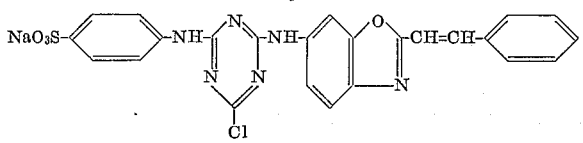

To a mixture of 3.46 grams sulfanilic acid, 150 grams water, 4 ml. 5 N NaOH solution and 100 ml. acetone, cooled to 0° C., is added 3.68 grams of cyanuric chloride in 100 ml. of acetone. The temperature is kept 0–5° C. and the pH maintained above 6 with 4 ml. 5 N NaOH solution until the reaction is complete.

To the 2,6-dichloro-4-(p-sulfoanilino)-s-triazine thus obtained is added 4.72 grams of the product of Example 13 in 150 ml. of acetone. The whole is heated to 50° C. and stirred until the reaction is complete (2 hrs.). It is then allowed to cool to room temperature, filtered, and the product washed with acetone, then water, then acetone, and dried at 40° C. under vacuum.

This brightener has excellent affinity for, and fluorescence on, cotton when applied in detergent solutions, and on wool and nylon when applied in acid solution. It is excellent in its ability to brighten cotton from a laundry acid sour bath.

Example 24

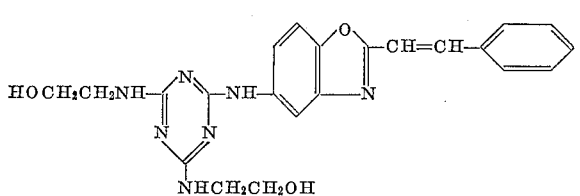

The procedure of Example 22 is followed except that the product of Example 16 is used instead of the product for Example 13. The product obtained is recrystallized twice from water-ethanol mixtures.

This product shows high affinity and fluorescence on cotton and good affinity for nylon. It forms blue fluorescent solutions in organic solvents such as methoxyethanol, ethanol, dioxan and the like.

Example 25

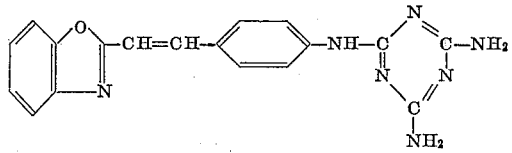

The procedure of Example 19 is followed except that the product of Example 14 is used in place of the product of Example 13, and 1.75 g. of 2-chloro-4,6-diamino-s-triazine in place of the chlorodimethoxytriazine. The product is a pale yellow solid which has blue fluorescence in dioxan solution, and shows good affinity and fluorescence on cotton and nylon.

Example 26

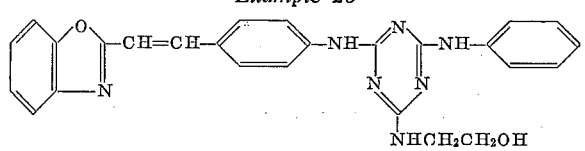

Two grams of the product of Example 14 is reacted with 1.55 g. of cyanuric chloride by the procedure of Example 22. Then 0.78 g. of aniline is added, and the mixture heated at 50° C. for one hour. After addition of one gram of ethanolamine the temperature of the reaction mixture is gradually raised by distilling off the acetone and replacing with methoxyethanol, and the mixture is held at reflux till reaction is complete. After cooling, and addition of water, the product is isolated by filtration. It shows a blue fluorescence in dioxan solution.

Example 27

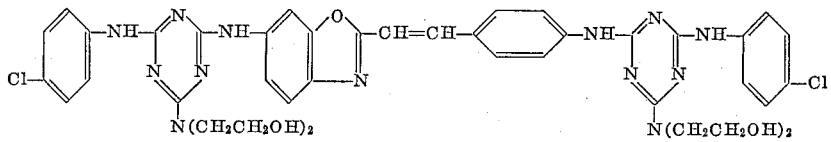

A mixture of 2.51 g. of the product of Example 15 and 3.7 g. of cyanuric chloride in 150 ml. of acetone is reacted at 0° C. with addition of 3.5 ml. of 5 N caustic in 50 ml. of water. After reaction is complete, 2.5 g. of p-chloroaniline is added and a second reaction allowed to proceed at 50° C. to completion. Then 4.2 g. of diethanolamine is added, the acetone removed and replaced by methoxyethanol, and the mixture heated at reflux till the final reaction is ended. After cooling and dilution with water the product is filtered off. It is a yellow solid having a strong blue fluorescence in dioxan solution.

Example 28

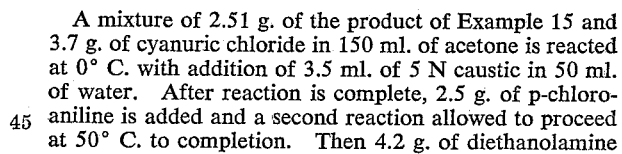

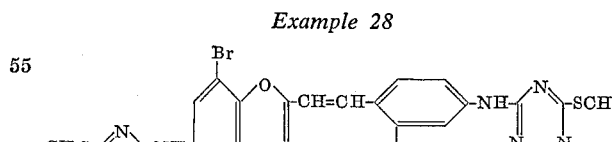

A mixture of 3.6 g. of the product of Example 17 and 3.7 g. of cyanuric chloride is reacted in 150 ml. of acetone at 0° C. with addition of 3.5 ml. of 5 N caustic, until the primary bis-condensation is complete. A solution of 3.3 g. of potassium methyl mercaptide in a minimum amount of 1% caustic is added, and the mixture is stirred at 50° C. for one hour. Following this, the acetone is removed and replaced by methoxyethanol, and heating is continued at reflux until the reaction is complete. After cooling, and dilution of the mixture with water, the product is recovered by filtration. It gives a blue fluorescent solution in dioxan and methoxyethanol.

*Example 29*

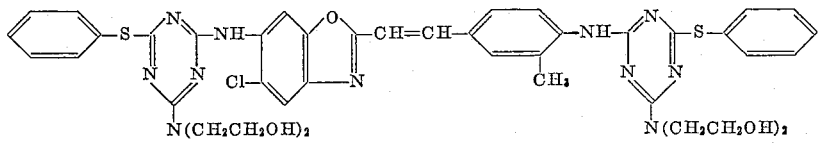

Three grams of the product of Example 18 is reacted with 3.7 g. of cyanuric chloride in acetone to form the primary bis-condensation product. Then 2.1 g. of diethanolamine is added, and the secondary condensation carried out at 50° C. (about one hour). A solution of 2.5 g. of thiophenol in a minimum amount of 5% caustic is then added, the acetone replaced by methoxyethanol, and the final condensation carried to completion at reflux. Dilution with water and filtration gives the product, which is recrystallized from methoxyethanol. It shows blue fluorescence in this solvent, and also fluoresces on nylon and acetate.

I claim:
1. A compound of the formula

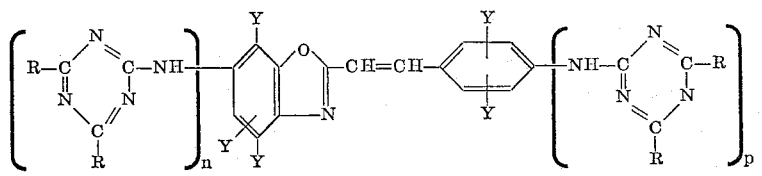

wherein each Y radical is a member selected from the group consisting of hydrogen, halogen, lower alkoxy, and lower alkyl, R is individually selected from the group consisting of halogen, hydroxy, lower alkoxy, amino, mono lower alkylamino, di lower alkylamino, mercapto, lower alkylthio, phenylthio, lower hydroxyalkylamino, bis-lower hydroxyalkylamino, lower alkoxyalkoxy, anilino and sulfoanilino; and $n$ and $p$ are integers less than two such that their sum is a positive integer less than three.

2. The compound of the formula

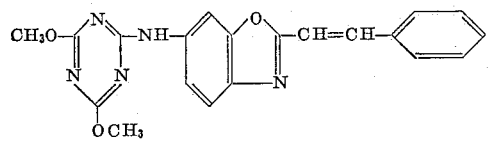

3. The compound of the formula

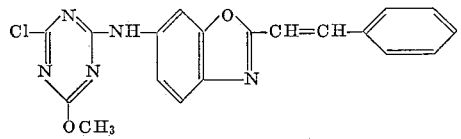

4. The compound of the formula

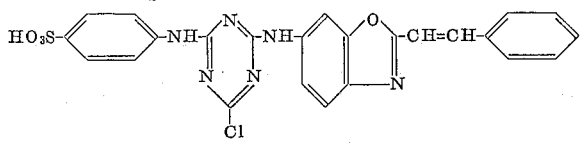

5. The compound of the formula

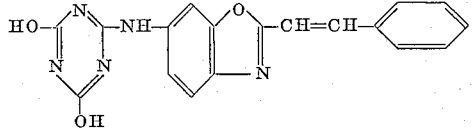

6. The compound of the formula

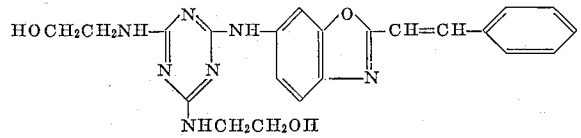

References Cited in the file of this patent

Conant et al.: The Chemistry of Organic Compounds, 3rd Edition, pages 558 to 560, the Macmillan Co., New York (1947), QD 251. C67.